Figure 1:
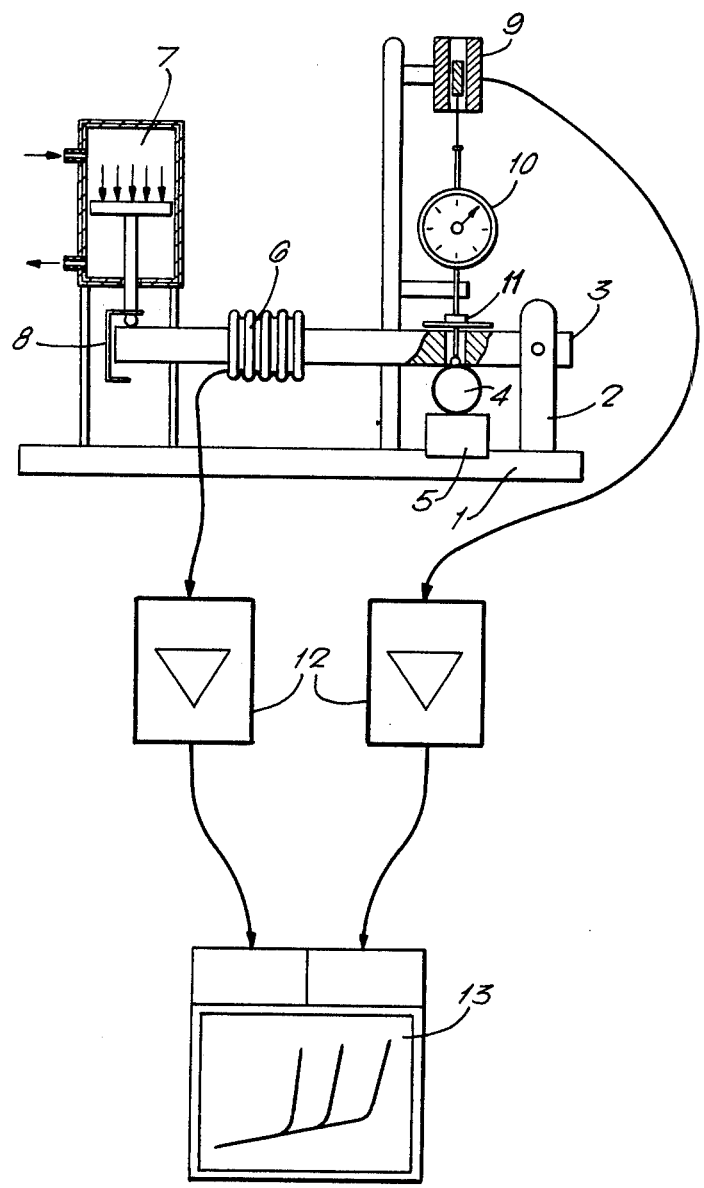

United States Patent [19]

Olshausen

[11] 4,108,719
[45] Aug. 22, 1978

[54] METHOD AND APPARATUS FOR GAUGING THE RADIAL SPACING BETWEEN FUEL AND SURROUNDING CLADDING OF A FUEL ROD FOR NUCLEAR REACTORS

[75] Inventor: Kai D. Olshausen, Raelingen, Norway

[73] Assignee: Institutt for Atomenergi, Kjeller, Norway

[21] Appl. No.: 766,003

[22] Filed: Feb. 7, 1977

[30] Foreign Application Priority Data

Feb. 12, 1976 [NO] Norway .................................. 760446

[51] Int. Cl.² ............................................. G21C 17/06
[52] U.S. Cl. ....................................... 176/19 R; 73/89
[58] Field of Search ................. 176/19, 68, 80; 73/89, 73/94

[56] References Cited

U.S. PATENT DOCUMENTS

| | | | |
|---|---|---|---|
| 3,164,010 | 1/1965 | Jones | 73/94 |
| 3,554,019 | 1/1971 | Van den Hove et al. | 73/89 |
| 3,621,580 | 11/1971 | Tovaglieri | 176/19 R |
| 3,628,376 | 12/1971 | Degg et al. | 73/89 |
| 3,771,357 | 11/1971 | Gambini | 73/94 |
| 4,036,686 | 7/1977 | Weilbacher et al. | 176/19 R |

Primary Examiner—Samuel W. Engle
Assistant Examiner—S. A. Cangialosi
Attorney, Agent, or Firm—Watson, Cole, Grindle & Watson

[57] ABSTRACT

A fuel rod for nuclear reactors normally comprises an internal fuel core surrounded by an external cladding, a radial spacing being advantageously arranged between said core and cladding in order to avoid hard interaction between said parts. According to the present invention said spacing is gauged by elastically squeezing the cladding at least until contact with the internal fuel core is obtained. During the squeezing process the change of elastic behavior of the squeezed cladding at the instance of said contact formation is detected by repeatedly or continuously sensing the applied squeezing force and resulting cladding deformation, the elastic deformation at said instance being measured as an expression of the spacing to be gauged.

4 Claims, 2 Drawing Figures

TYPICAL FORCE-DEFORMATION GRAPHS

METHOD AND APPARATUS FOR GAUGING THE RADIAL SPACING BETWEEN FUEL AND SURROUNDING CLADDING OF A FUEL ROD FOR NUCLEAR REACTORS

The present invention is related to a method and an apparatus for gauging the radial spacing between fuel and surrounding cladding of a fuel rod for nuclear reactors.

It is known that mechanical interaction between fuel (usually uranium oxide pellets) and cladding (usually a Zircaloy tube, Zircaloy = a zirconium alloy) may result in failures in fuel rods for nuclear reactors, primarily due to the different thermal expansions of fuel and cladding, respectively, in operation.

In order to avoid such failures a certain clearance or gap is provided between fuel and cladding, so that no so called "hard" mechanical interaction may take place during the starting period of the reactor. However, in the course of the continued normal operation of the reactor certain changes may occur, which may cause a reduction of said clearance. With this a risk for a failure of the fuel rod is created.

It is therefore important that the mentioned clearance may be readily measured, either within the reactor in operation or after the removal of the fuel element containing the rod to be measured, from the reactor.

Because irradiated fuel rods are highly radioactive, all manipulations of the same must take place behind a thick screen, which to a great extent complicates the investigations and measurements which are to be performed.

It is previously known to gauge the spacing between fuel and cladding by means of neutron radiography. Similarily it is known to determine said spacing by the application of metallography or ceramography. In this case a sample is cut out of the fuel rod. Thus, e.g. by observations in a microscope, a more or less accurate determination of the spacing may be made. The latter method is of course destructive, which is a definite disadvantage.

Both the above known methods are expensive and not very accurate. Also, they can only be applied to demounted rods, as such measurements are not possible inside a reactor.

On this background it is an object of the present invention to indicate a method for gauging the radial spacing between fuel and surrounding cladding of a fuel rod for nuclear reactors, and by which the above disadvantages may be overcome.

This is achieved according to the invention by the fact that said cladding is squeezed to form contact with the internal fuel, the squeezing force and the corresponding deformation being repeatedly measured, and the respective measured values correlated in order to determine said contact formation and the corresponding deformation of the cladding.

According to a further feature of the invention the respective measured values are continuously recorded along individually associated axes of a X/Y-recorder, thereby providing a force/deformation graph indicating said contact formation and the corresponding deformation of the cladding.

However, according to an alternative embodiment of the invention the respective measured values are received by a digital processor programmed to repeatedly performing said correlation and thereby determining said contact formation and the corresponding deformation of the cladding.

The invention also includes an apparatus for performing the above method and being characterized by the features that the apparatus comprises a lever pivoted at one end and provided with a force gauging sensor, a force generating device disposed in force transferring relationship with the lever, a squeezing gap being provided between a section of said lever and a support block for the insertion of a fuel rod to be squeezed, and said lever section being provided with a bore for insertion of a deformation sensing rod in contact with said fuel rod.

The indicated method according to the invention is non-destructive, and may be performed with reasonable expenses. With remote control this method may readily be performed in radioactive environments. It may be applied to sample rods in a test reactor, to ordinary fuel elements submerged in the water pool of a nuclear power plant, or to rods transferred to a high-activity laboratory for post-examination. As the method is non-destructive, a fuel rod may be remounted in the reactor after being tested.

The working principle of gauging according to the present method is that the cladding tube is mechanically squeezed until it forms contact with the fuel itself. As only small clearances and small deformations are concerned, the squeezing is all the time performed within the elastic range of the cladding tube. Thus, initially the elastic performance of the rod will correspond to the behaviour of an empty elastic tube. However, as soon as contact between tube and fuel is established, the rod will exhibit a more rigid behaviour, and it is this change of performance which is used for the determination of the spacing. By providing the mechanical squeezing device with force and deformation sensors, respectively, and by continuously recording the sensed force and deformation values along individually associated axes of a X/Y-recorder, a suitable force/deformation graph may be produced from which the relevant spacing may be deduced.

Figure 2:
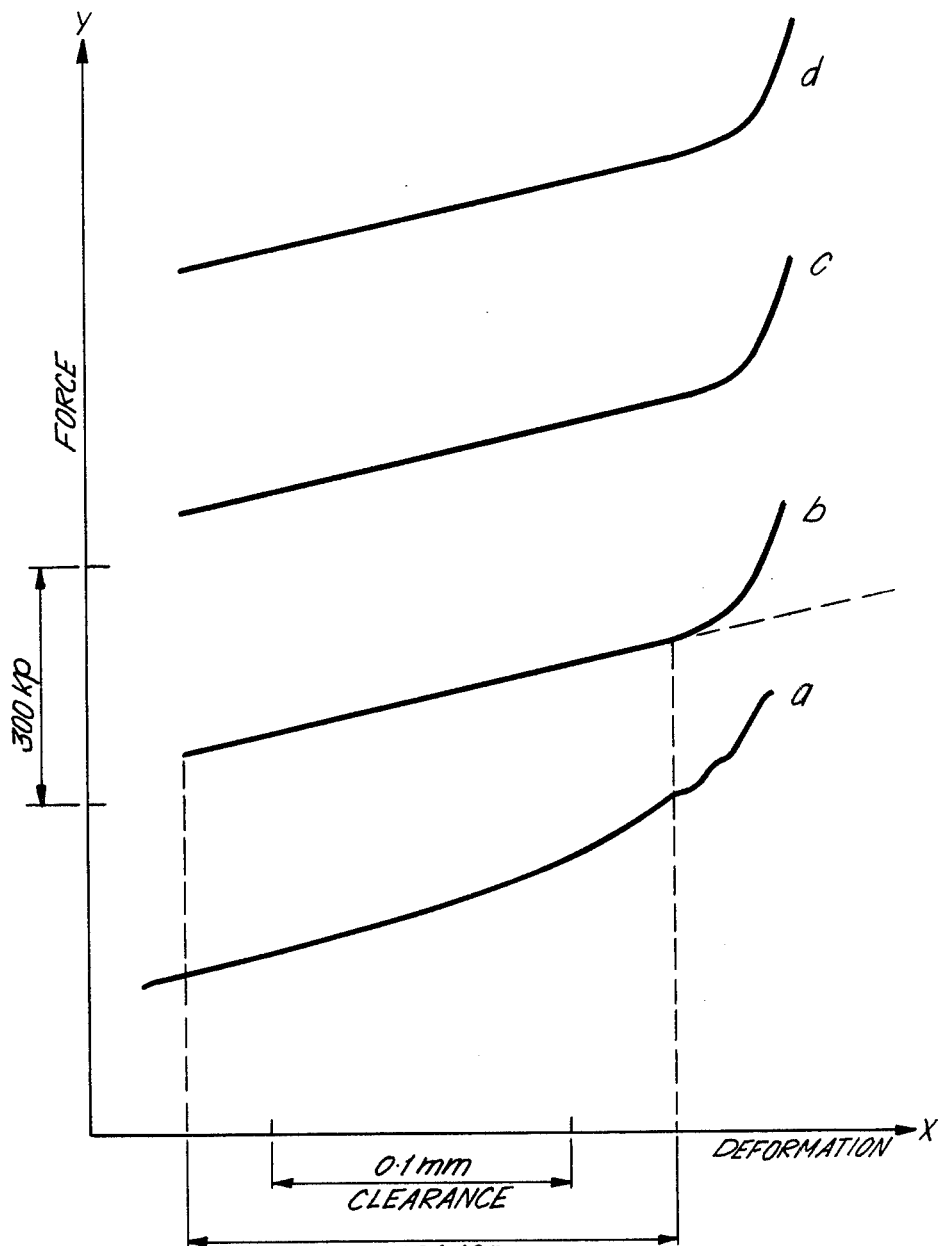

The invention will now be illustrated in more detail with reference to the accompanying drawings, on which:

FIG. 1 shows an apparatus for performing the method according to the invention, and FIG. 2 shows typical force/deformation graphs produced by the preferred embodiment of the method according to the invention.

Referring to FIG. 1, a bearing block 2 is shown fixed to a base plate 1. On this block a lever 3 is pivotably disposed to be pressed against a fuel rod 4 placed on a plane support 5, which may be suitably replaced in order to adapt the apparatus to different rod sizes. Said lever is provided with a force sensor 6 connected with an electric lead. This sensor comprises conventional strain gauges providing electrical output signals representing sensed strains in the lever 3. At the free end of said lever a pneumatic cylinder 7 is supported by the base plate 1. The piston of this cylinder may be moved up and down by means of a pair of compressed air lines. When positioning the rod, the piston is moved to its top position, in order to raise the lever by means of a bracket 8 (piston and lever are not integrally connected). During the gauging process the air pressure on the upper side of the piston is gradually increased in order to put a load on the fuel rod. The resulting deformation is measured by means of a deformation sensor 9 comprising a differential transformer and being connected with a bar in spring biased contact with the cladding of the rod through a bore traversing the lever. Between the deformation sensor 9 and the rod 4 a dial micrometer is inserted, which, however, is not used directly for said deformation measurements, but rather for the calibration of the deformation sensor. Such calibration preferably takes place by squeezing the rod with a force producing a certain dial deviation on the micrometer (e.g. 100 scale graduation marks corresponding to 0.1 mm), and marking out the corresponding distance along the associated axis on the X/Y-recorder. On the gauge bar between the dial micrometer and the fuel rod a sleeve 11 is disposed in such a manner that the gauge rod will be raised and the fuel bar detached, when the lever 3 is raised. The output signals produced by the force and deformation sensors, respectively, are suitably recorded by means of combined deviation units and amplifiers 12 and a X/Y-recorder 13.

Although the gauging principle employed according to the invention is based on a mechanical deformation of the cladding tube and a recording of its elastic behaviour, the practical embodiment of the squeezing device and the measuring equipment may take various forms.

In the embodiment described above, a certain load distribution pattern is employed (force distributions along lines parallel with the rod axis on opposite sides of the rod), but other force distributions, e.g. point forces, more than two force directions, various distributions axially or circumferentially, may give equally good results.

The structural design of the squeezing device is dependent on where it is to be used, e.g. in a reactor, in a reactor pool or in a high-activity laboratory. Electromechanic, hydraulic, pneumatic or purely mechanic systems may be employed. The measurements of force and deformation may take place in various ways, and sensors of different types may be used.

In order to facilitate the evaluation of the measuring results obtained, in addition to the described recording of force/deformation graphs, digital registrations may be made by means of A/D-converters, digital magnetic tape or punched tape and a suitably programmed processor. With such system correlated force and deformation registrations may be repeated at a certain gauging rate, e.g. ten measurements per second. This means that a pair of d.c. voltage values, respectively proportional to force and deformation, are measured by means of digital voltmeters, and that the correleated digit combinations produced in this way, are digitally recorded on the magnetic tape each tenth of a second. In accordance with the processor program said d.c. voltage values are converted to corresponding values of force and deformation, respectively, in order to define a curve of elasticity for the squeezing process, and to determine the point where said curce deviates with a given amount from its initial linear path. Finally, said processor is programmed to deduce the spacing between fuel and cladding from the deformation value corresponding to said point.

In order to illustrate the present method FIG. 2 shows some force/deformation graphs recorded from measurements on an irradiated fuel rod, as described above. With a first elastic squeezing of the rod a graph $a$ is obtained. This graph $a$ is more or less curved along its whole extension, which means that no linear elastic portion of the graph may be discerned. This is apparently due to the fact that the fuel after the irradiation no longer forms a massive cylinder, but it cracked into several mutually displaced pieces. Thus, a certain adaption of the fuel material is due to take place during the first squeezing of the rod. The graphs i b,c and $d$ represent a second, third and fourth squeezing, and each of these graphs clearly displays an initial linear portion which at a certain point passes into a curved portion. A zero point displacement parallel to the Y-axis was performed after each graph recording in order clearly to separate the graphs from each other, as indicated in the Figure. The distance in the X-direction from the starting point of a graph to the point where the graph deviates from its linear path, represents the clearance or spacing to be gauged.

I claim:
1. Method for gauging the radial spacing between fuel and surrounding cladding of a fuel rod for a nuclear reactor comprising the steps
   squeezing said cladding until contact is formed with the internal fuel, repeatedly measuring the squeezing force and the corresponding deformation, and correlating the respective measured values in order to determine said contact formation and the corresponding deformation of the cladding in order to obtain a measure of said radial spacing.
2. Method as claimed in claim 1, including the further step of continuously recording the respective measured values along individually associated axes of a X/Y-recorder, thereby providing a force/deformation graph indicating said contact formation and the corresponding deformation of the cladding.
3. Method as claimed in claim 1,
   including the further steps of sending the respective measured values to a digital processor programming said digital processor to repeatedly perform said correlation and thereby obtaining said radial spacing by determining said contact formation and the corresponding deformation of the cladding.
4. Apparatus for performing the method claimed in claim 1 for gauging the radial spacing between fuel and surrounding cladding of a fuel rod for nuclear reactors,
   comprising the apparatus comprises a lever pivoted at one end and provided with a force gauging sensor, a force generating device disposed in force transferring relationship with the lever, a squeezing gap being provided between a section of said lever and a support block for the insertion of a fuel rod to be squeezed, and said lever section being provided with a bore for insertion of a deformation sensing rod in contact with said fuel rod.

* * * * *